United States Patent
Rivera

(10) Patent No.: US 6,189,458 B1
(45) Date of Patent: Feb. 20, 2001

(54) COLLAPSIBLE TABLE HOLDER FOR ATTACHMENT TO A TRAILER HITCH OF A MOTOR VEHICLE

(76) Inventor: George Rivera, 4305 N. Sunflower, Covina, CA (US) 91724

( * ) Notice: Under 35 U.S.C. 154(b), the term of this patent shall be extended for 0 days.

(21) Appl. No.: 09/347,566

(22) Filed: Jul. 6, 1999

(51) Int. Cl.$^7$ .................................................. B60R 27/00
(52) U.S. Cl. ............................ 108/44; 108/150; 224/488
(58) Field of Search ............................. 108/44, 150, 115, 108/50.12, 152, 134, 135; 224/484, 488, 521, 524, 525; 248/188.6, 284.1, 528, 529; 135/99

(56) References Cited

U.S. PATENT DOCUMENTS

| | | | |
|---|---|---|---|
| 5,397,147 | * 3/1995 | Ducharme et al. | ............... 224/524 X |
| 5,518,159 | * 5/1996 | DeGuevara | ....................... 224/524 X |
| 5,628,126 | 5/1997 | McNulty . | |
| 5,640,949 | 6/1997 | Smith . | |
| 5,752,639 | * 5/1998 | Rice | ..................................... 224/521 |
| 5,820,004 | * 10/1998 | Lane | ............................. 224/525 X |
| 5,857,741 | 1/1999 | Anderson . | |
| 5,881,937 | * 3/1999 | Sadler | ............................... 224/521 X |
| 5,950,617 | 9/1999 | Lorenz . | |
| 6,000,594 | * 12/1999 | Chimnenti | ........................ 224/488 X |

* cited by examiner

Primary Examiner—Jose V. Chen
Assistant Examiner—Michael J. Fisher
(74) Attorney, Agent, or Firm—Morland C. Fischer

(57) ABSTRACT

A collapsible holder having a first end to be detachably connected to a conventional trailer hitch at the rear of a motor vehicle and a second end to be detachably coupled to a folding table. The collapsible holder has a pair of outer arms that are pivotally connected to opposite ends of a middle arm. When the collapsible holder is detached from the trailer hitch and uncoupled from the folding table, the outer and middle arms are adapted to be rotated into face to face alignment, with one arm located above the other, to form a compact package that is suitable for transport and storage between uses. In order to support an outdoor grille from the collapsible holder, an inner coupling post that is affixed to the grille is slidably received within and engaged by an outer coupling post that is affixed to the holder. In the alternative, the outdoor grille is coupled to the collapsible holder by a removable coupling attachment. The coupling attachment has a coupling post at one end thereof to carry the grille and a locking plate at the opposite end to be connected to the holder.

11 Claims, 5 Drawing Sheets

COLLAPSIBLE TABLE HOLDER FOR ATTACHMENT TO A TRAILER HITCH OF A MOTOR VEHICLE

BACKGROUND INVENTION

1. Field of the Invention

This invention relates to a collapsible holder by which some or all of a table, an umbrella and an outdoor grille may be coupled to a motor vehicle at a conventional trailer hitch. The collapsible holder is adapted to be conveniently folded into a compact package to facilitate the transport and storage thereof between uses.

2. Background Art

Families seeking recreation often choose to go camping or simply have a cook out. However, such out of doors activities can be complicated by the need to find a shaded camp site, a table and an open grille upon which to cook food. Consequently, in some cases, campers are required to carry with them bulky and space consuming cooking and camping equipment. In other cases, the campers must set up their cooking site far from their motor vehicle which increases inconvenience and leaves the family vehicle unattended during the cook out. In still other cases, the family may be subjected to a waste of time and/or disappointment if it is unable to find an outdoor grille which is available for use.

In order to avoid the aforementioned problems and potential inconveniences described above, it would be desirable to have available a compact, easy to use holder that can be conveniently coupled to the family vehicle to enable a picnic, cook out, and the like, to be held near the vehicle while avoiding the necessity of having to carry a table, a shade producing umbrella, and an outdoor grille while, at the same time, trying to find a suitable picnic area.

One example of a hitch mounted holder is available by referring to U.S. Pat. No. 5,752,639 issued May 19, 1998.

SUMMARY OF THE INVENTION

A collapsible holder is disclosed to the removably attached at one end to a trailer hitch at the rear of a motor vehicle. The opposite end of the holder is adapted to be coupled to a folding table and/or an outdoor grille of the type commonly used for a barbecue. The collapsible holder of this invention has a middle arm member that is pivotally connected at each end thereof between a pair of outer arm members. One of the pair of outer arm members is detachably connected to the trailer hitch. When the folding table and the grille are uncoupled from the collapsible holder and the holder is removed from the trailer hitch, the holder can be folded into a compact package that is suitable for transport and storage between uses. More particularly, a first of the pair of outer arm members is rotated downward and into face-to-face alignment with the middle arm member, and the middle arm member is then rotated downward and into the face-to-face alignment with the second outer arm member.

The folding table has a central base and a pair of folding leaves. A hollow coupling sleeve is mounted at the bottom of the central base. The coupling sleeve is sized to engage the outer arm member of the collapsible holder that is not connected to the trailer hitch so that the table is coupled to the holder. The pole of an umbrella may be located through a hole in the central base of the table for receipt by the hollow coupling sleeve below the central base. Each of the table leaves is pivotally connected to the central base by a pair of hinges so that the leaves can be rotated downward and into face-to-face alignment with the bottom of the central base. A pair of pop-up hinges are associated with each folding leaf of the table to retain each leaf at its folded position below the central base.

According to one embodiment, a hollow coupling post projects from the outer arm member of the collapsible holder that is not connected to the trailer hitch. The coupling post is sized to receive a complementary coupling post that projects from the collection pan of an outdoor grille so that the grille is coupled to the collapsible holder. According to an alternate embodiment, a hollow coupling post is mounted below the collection pan of the outdoor grille. The coupling post is sized to engage a complementary coupling post that projects from one end of a coupling attachment. The opposite end of the coupling attachment is secured, by means of a coupling finger and a locking plate, to the outer arm member of the collapsible holder that is not connected to the trailer hitch so that the outdoor grille is coupled to the collapsible holder by way of the coupling attachment.

DETAILED DESCRIPTION

Figure 1:
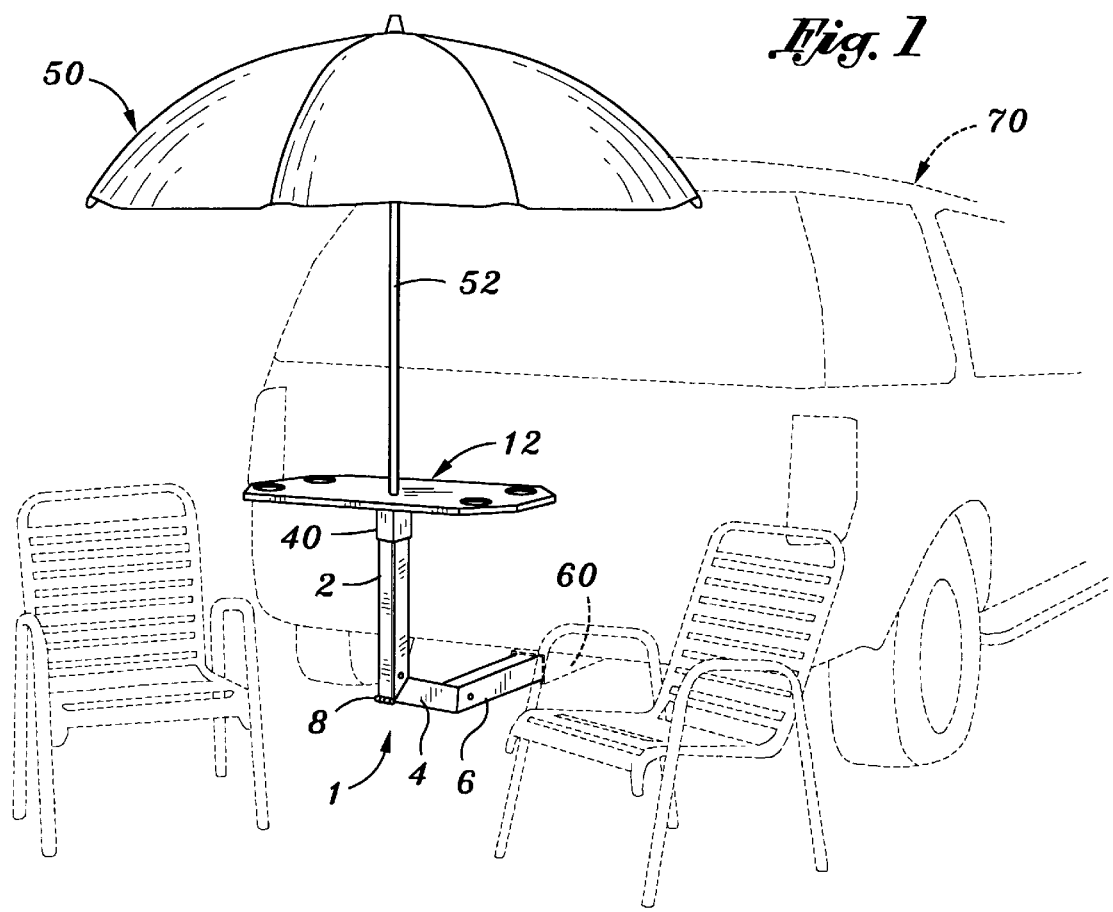
FIG. 1 shows the collapsible holder which forms the present invention attached to the trailer hitch of a motor vehicle to support a folding table and an umbrella.
Figure 2:
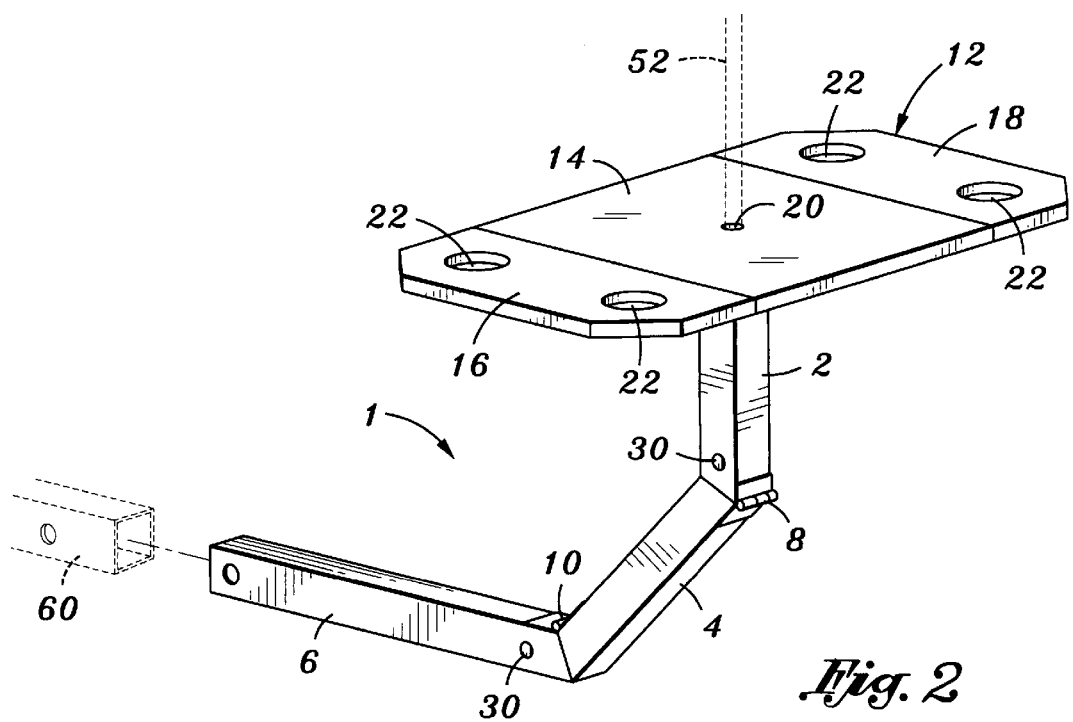
FIG. 2 is a detailed illustration of the collapsible holder of FIG. 1.

The collapsible holder 1 which forms the present invention is described in detail while initially referring to FIGS. 1 and 2 of drawings. In a first case, and as will be described in greater detail, the collapsible holder 1 is adapted to support a conventional umbrella 50 of the type that would typically be used at a picnic or at the beach to provide shade to the user. However, by virtue of the present invention, the collapsible holder 1 can be easily coupled to a trailer hitch 60 of a motor vehicle (shown in broken lines in FIG. 1 and represented by the reference numeral 70) so that the umbrella 50 can now be employed at any one of a variety of different locations to which the motor vehicle 70 can be driven.

The collapsible holder 1 has three arm members 2, 4 and 6 that are connected end-to-end and rotatable relative to one another by means of hinges 8 and 10 so as to extend between the trailer hitch 60 of the vehicle 70 and a table 12 to receive and support the umbrella 50. The table 12 has a central base 14 and a pair of folding leaves 16 and 18 located at opposite ends of the central base 14. The central base 14 of table 12 has a hole 20 that is sized to receive the usual pole 52 of the umbrella 50 so that the umbrella can be supported above the table 12 to cover the food that will be placed on top of the central base 14 and the table leaves 16 and 18. Each leaf 16 and 18 of table 12 has a pair of cup holes 22 that are sized to receive and retain respective drinking cups (not shown) by which to provide the user with the convenience of being able to have access to a beverage without the risk that his cup will fall off the table 12.

Figure 3:
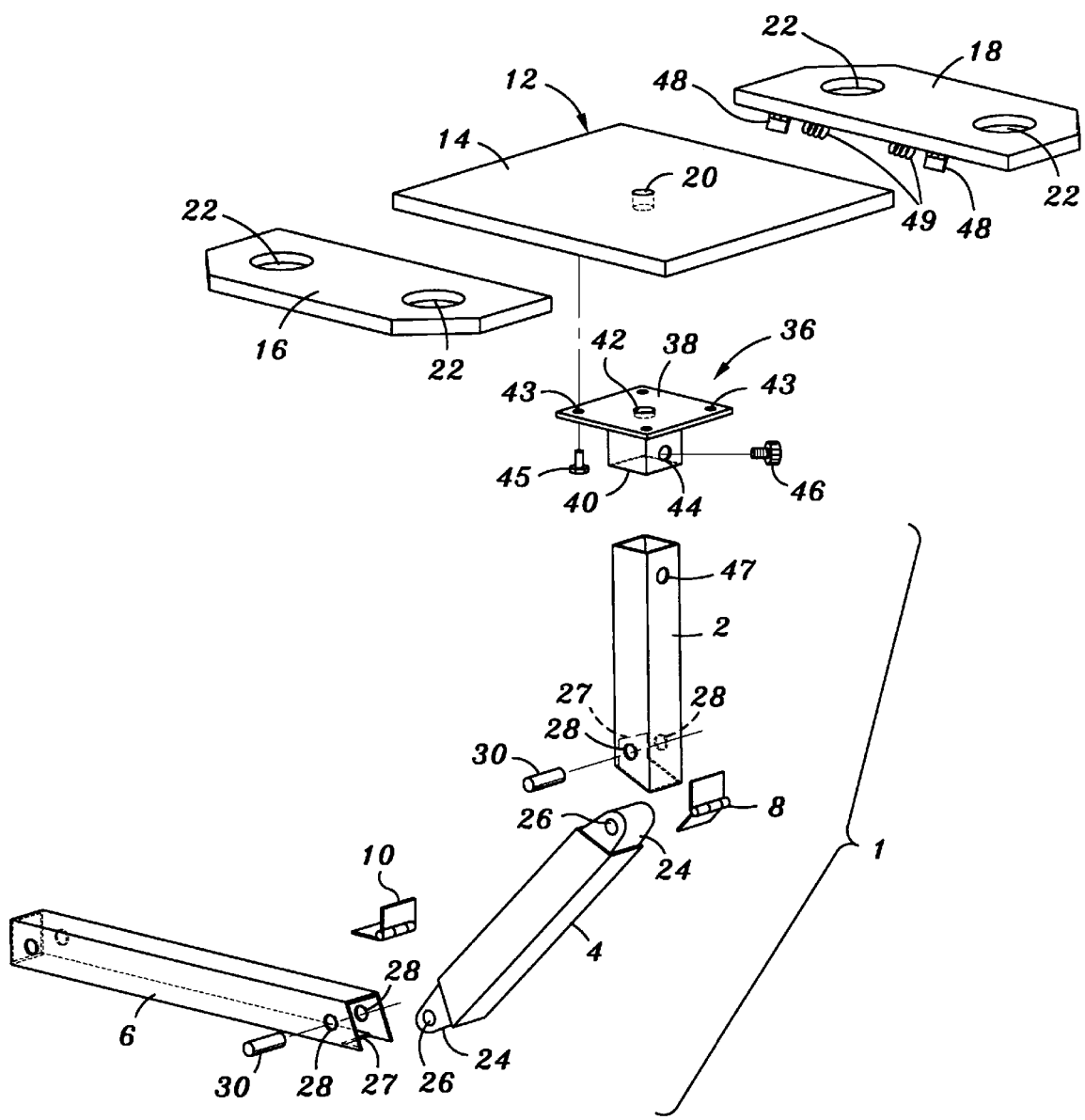
FIG. 3 is an exploded view of the collapsible holder of FIG. 1.

Turning to FIG. 3 of the drawings, the collapsible assembly of the holder 1 of FIGS. 1 and 2 is now described. Each of the arm members 2,4 and 6 of the collapsible holder 1 is manufactured from open ended steel channel. The middle arm member 4 is located between and is pivotally connected to each of the outer arm members 2 and 6. In particular, the middle arm member 4 is provided with a pair of joints 24 that project from opposite ends thereof. Each joint 24 has a pin hole 26. The joints 24 of middle arm member 4 are received within the open ends of the adjacent outer arm members 2 and 6 such that the pin holes 26 of the joints 24 are aligned with pin holes 28 formed at the receiving ends of the outer arm members 2 and 6. Locking pins 30 are removably received through the axially aligned pin holes 28 and 26 in the receiving ends of the outer arm members 4 and 6 and the joints 24 of middle arm member 4 so that the arm members 2,4 and 6 can be are rotatable relative to one another and retained in the outreached configuration shown in FIGS. 1 and 2 between trailer hitch 60 and table 12.

In the assembled configuration of FIG. 2, a first hinge 8 is connected to each of the outer and middle arm members 2 and 4 at the interface therebetween, and a second hinge 10 is connected to each of the middle and outer arm members 4 and 6 at the interface therebetween. A cut out 27 is formed in the receiving end of each outer arm member 4 and 6 to enable the arm members 2,4 and 6 of collapsible holder 1 to be rotated and folded one above the other.

A table mount 36 is provided to detachably connect the table 12 to the collapsible holder 1. The table mount 36 has a flat rectangular base 38 that lies upon a hollow rectangular sleeve 40. A hole 42 is formed through the center of the flat base 38 to communicate with the hollow sleeve 40. Screw holes 43 are formed through each of the corners of the rectangular base 38, and a through hole 44 is formed in one side of the rectangular sleeve 40 of table mount 36.

In the assembled configuration, suitable fasteners (e.g. screws 45) are inserted through the screw holes 43 in the flat base 38 for attachment at the bottom of the central base 14 of table 12, whereby to connect the table 12 to the table mount 36. The sleeve 40 of table mount 36 which lies below the flat base 38 is of sufficient size to surround the end of the outer arm member 2 of collapsible holder 1 which is opposite the end that receives the joint 24 of middle arm member 4. With the sleeve 40 coupled to the outer arm member 2, the threaded shaft of a locking knob 46 is inserted into the through hole 44 in the sleeve 40 of table mount 36 as well as a threaded, axially aligned hole 47 that is formed through the outer arm member 2. When it is desirable to remove the table 12 and collapse the holder 1, the locking knob 46 is rotated and the shaft thereof is removed from the holes 44 and 47 in the sleeve 40 of table mount 36 and the outer arm member 2 of collapsible holder 1. At this point, the table mount 36 can be uncoupled from the outer arm member 2, whereby the table 12 is detached from the collapsible holder 1 for storage and transport.

With the table 12 connected to the collapsible holder 1 as just described, the hole 20 through the central base 14 of the table 12 is axially aligned with the hole 42 through the flat base 38 of table mount 36. Accordingly, the pole 52 of the umbrella 50 may be received through the holes 20 and 42 to be retained within the hollow outer arm member 2 of collapsible holder 1 and thereby prevent the umbrella from accidentally falling or blowing off the table 12.

As an additional advantage of the present invention, the table 12 is adapted to be folded into a compact configuration to conserve space during transport and storage. To this end, each of the folding leaves 16 and 18 of the table 12 is provided with a pair of hinges 48 by which to pivotally couple the leaves 16 and 18 to the central base 14 so that the leaves 16 and 18 can be rotated downward from the upright position during use (as shown in FIGS. 1 and 2) to a position against the bottom of the central base 14. In order to hold the leaves 16 and 18 of table 12 at the downward position folded under the central base 14, each leaf 16 and 18 is also provided with a pair of conventional spring loaded pop-up hinges 49. As will be known to those skilled in the art, the pop-up hinges 49 are activated (i.e. extended and locked in place) to prevent the folding leaves 16 and 18 from rotating upwards and away from the bottom of the central base 14 of table 12.

Figure 4A:
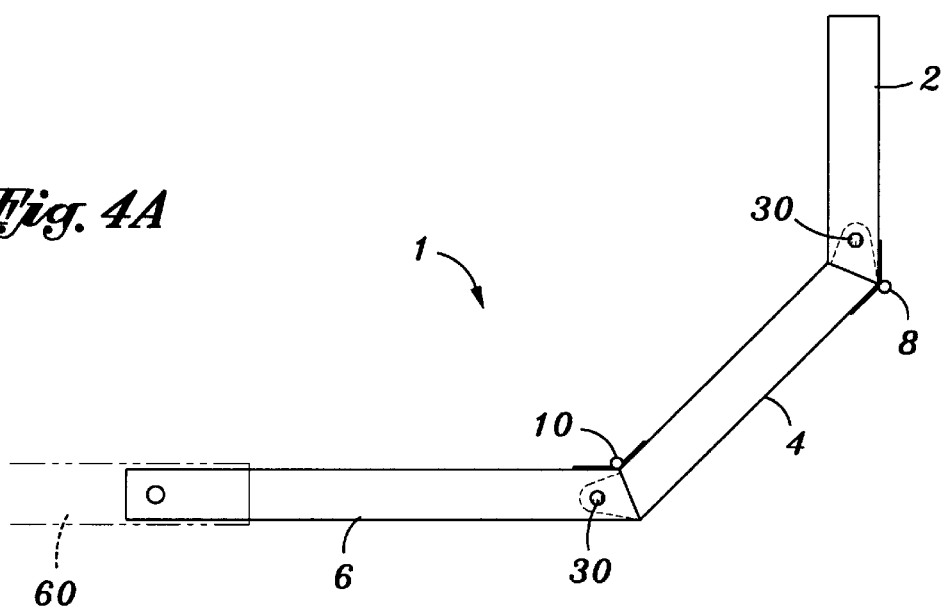
FIGS. 4A, 4B and 4C illustrate the steps by which the collapsible holder is folded into a compact package when not in use.

FIG. 4 of the drawings illustrates the collapsible nature of the holder 1 of this invention. FIG. 4A shows the collapsible holder 1 fully employed in an outstretched condition so that the table 12 can be supported from the trailer hitch 60 of a motor vehicle in the manner that was just described.

Figure 4B:
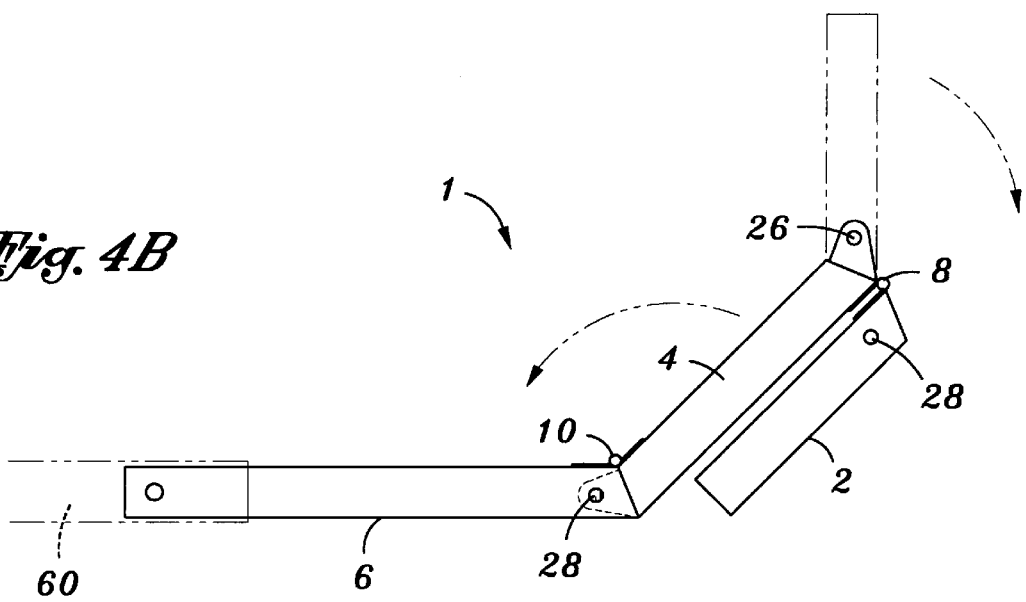
Figure 4C:
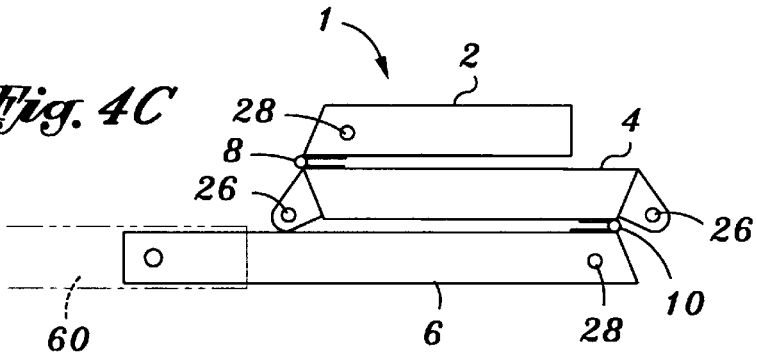

However, after the table 12 has been uncoupled from the collapsible holder 1, it may be desirable to remove the holder from the hitch 60 so that it can be stored away to await the next use. To facilitate storage, the holder is collapsed from the outstretched condition of FIG. 2A into a compact package as shown in FIG. 4C. To achieve this compact package following the removal of the collapsible holder 1 from hitch 60 the locking pins 30 are first removed from pin holes 26 and 28. Then, and as shown in FIG. 4B, the outer arm member 2 is rotated around its hinge 8 so as to lie below and in face to face alignment with the middle arm member 4. Next, and as is shown in FIG. 4C, the middle arm member 4 is rotated around its hinge 10 so as to lie above and in face to face alignment with the outer arm member 6. In the compact folded package of FIG. 4C, the outer and middle arm members 2,4 and 6 of collapsible holder 1 are positioned one over the other to facilitate transport and storage between uses.

Figure 5:
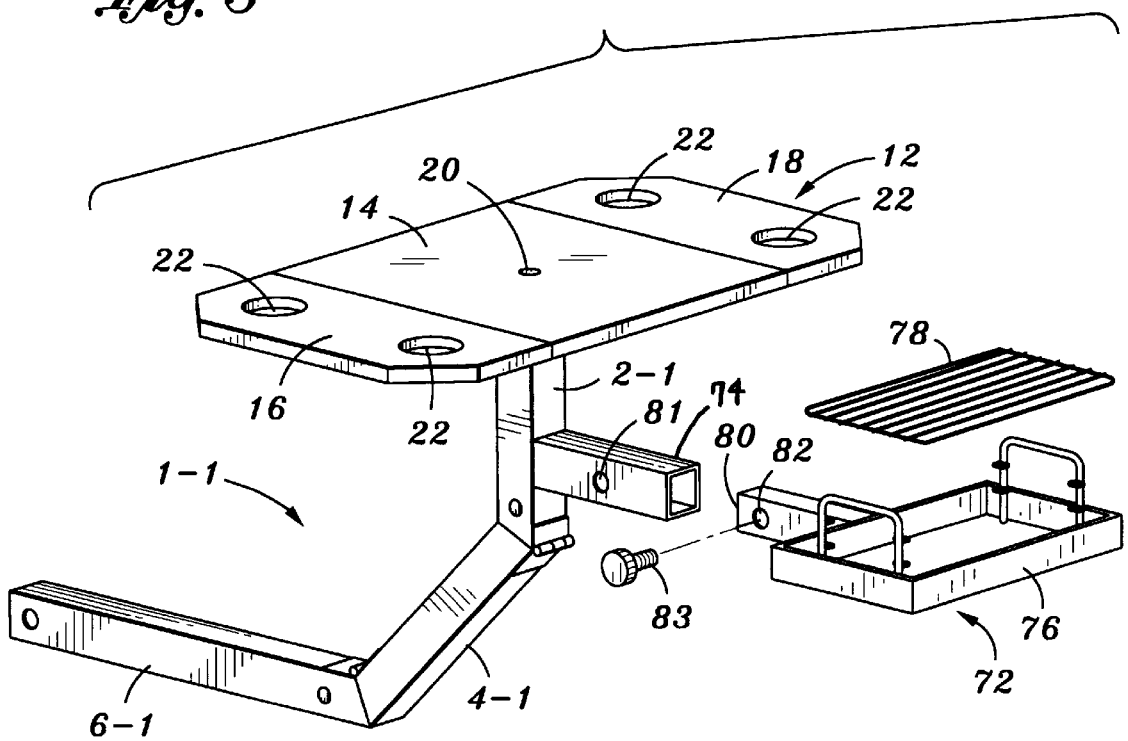
FIGS. 5 and 6 show a first modification to the collapsible holder of the present invention to support an outdoor grille.
Figure 6:
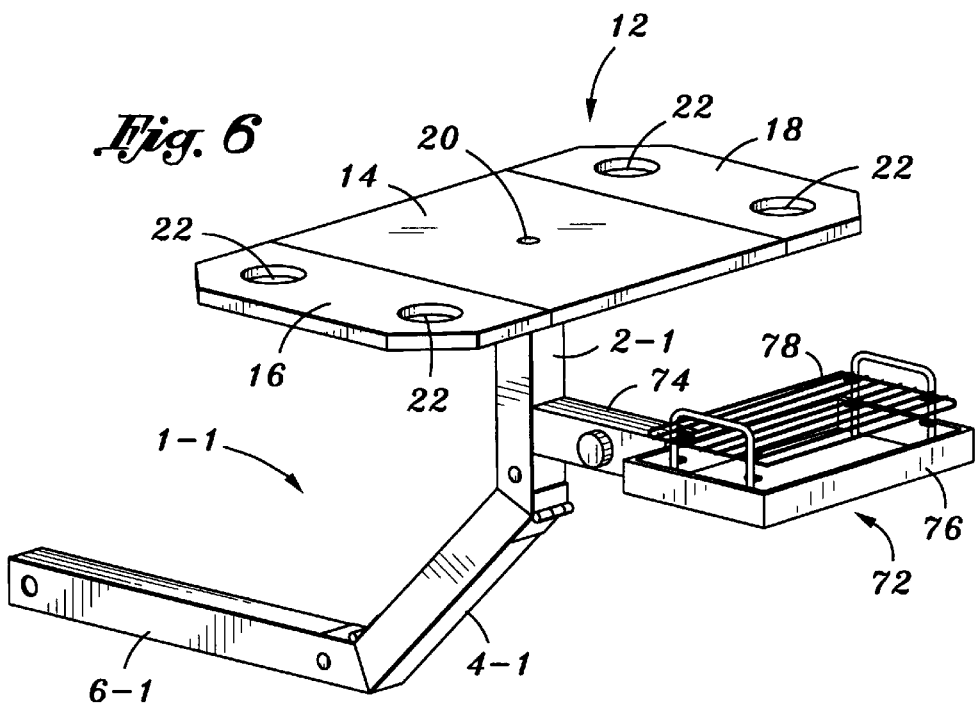

FIGS. 5 and 6 of the drawings show another embodiment of the invention where the collapsible holder 1 of FIGS. 1–4 is modified to receive and retain an outdoor grille 70. In the case of FIGS. 5 and 6, the collapsible holder 1-1 can be used in connection with the folding table 12 previously described above and the outdoor grille 70 to be described below to enable the user to have a barbecue with holder 1-1 coupled to the hitch of a motor vehicle as was described above when referring to FIG. 1.

The modified collapsible holder 1-1 of FIGS. 5 and 6 includes outer and middle arm members 2-1, 4-1 and 6-1 With a hollow rectangular post 74 projecting outwardly from the outer arm member 2-1. The outdoor grille 72 includes a collection pan 76 above which the usual grate 78 is seated.

Projecting from the collection pan 76 in a hollow rectangular post 80 that is sized to be received by and slide through the hollow post 74 of the collapsible holder 1-1. The hollow post 74 has a first hole 81 formed therein, and the hollow post 80 has a threaded, axially aligned second hole 82 formed therein. With the inner post 80 of grille 72 received by the outer post 74 of the collapsible holder 1-1, the holes 81 and 82 will be aligned with one another to receive a threaded fastener 83. Accordingly, the outdoor grille 72 is detachably connected to the collapsible holder 1-1 at the post 74 thereof. In this same regard, the grille 72 can be detached from the holder 1-1 by simply removing the fastener 83 and sliding the post 80 of grille 72 out of the post 74 of the holder.

Figure 7:
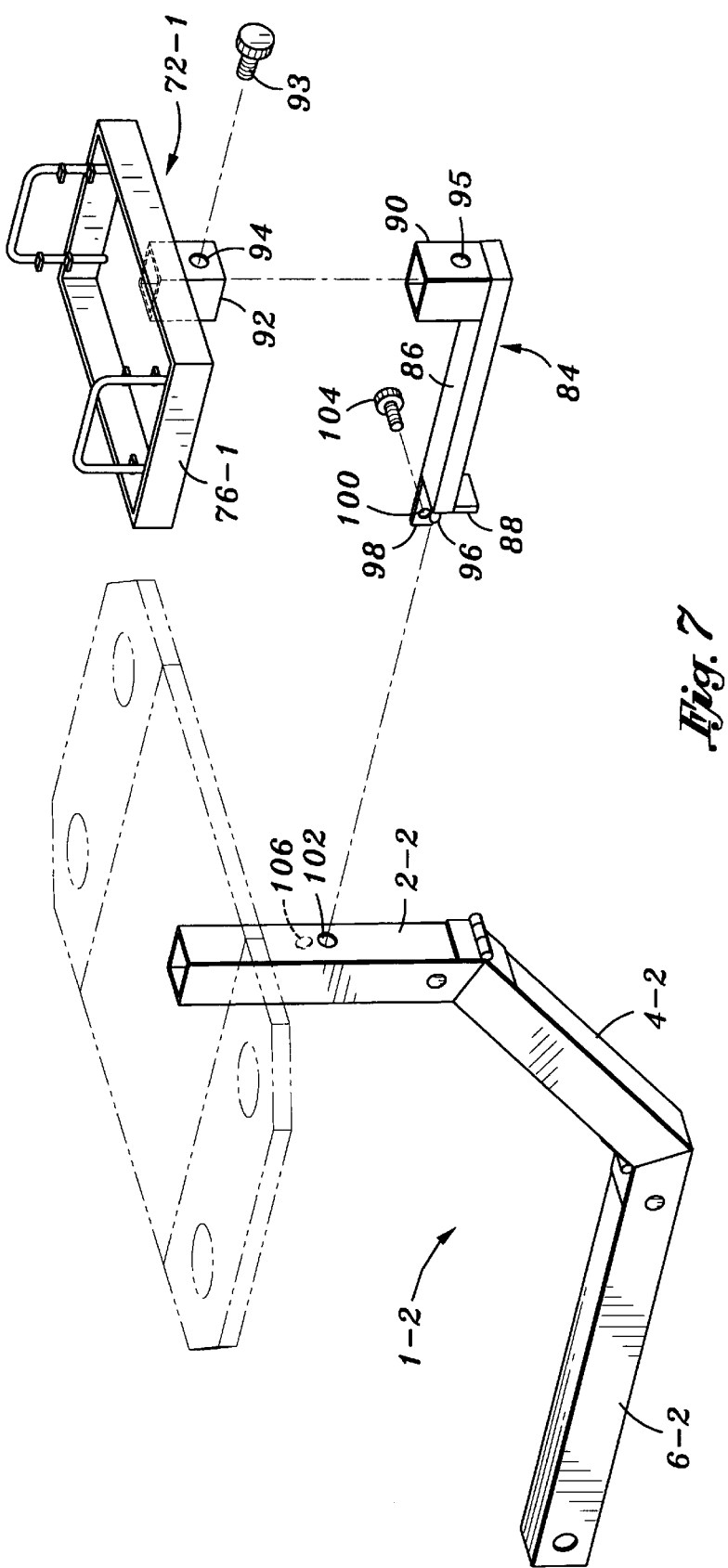
FIG. 7 shows another modification of the collapsible holder to support an outdoor grille.

Referring now to FIG. 7 of the drawings, an alternate embodiment is shown for the outdoor grille attachment of FIGS. 5 and 6. The advantage of this alternate embodiment is to permit the collapsible holder 1-2 to be completely folded into the compact package shown in FIG. 4C when the grille 72-1 is detached from holder 1-2. That is to say, the post 74 which projects from the outer arm member 2-1 of the collapsible holder 1-1 of FIGS. 5 and 6 will interfere with the ability of the outer arm member 2-1 to rotate downward and into complete face to face alignment with the middle arm member 4-1 of holder 1-1.

To preserve the ability of the collapsible holder 1-2 of FIG. 7 to be folded, a coupling attachment 84 is provided by which to couple the outdoor grille 72-1 to the holder 1-2. In this case, the attachment 84 includes a flat base 86 having a coupling plate 88 affixed to and extending downwardly from a first end of base 86 and a hollow rectangular coupling post 90 projecting upwardly from the opposite second end. The outdoor grille 72-1 includes a hollow rectangular coupling post 92 projecting downwardly from the bottom of collection pan 76-1. The coupling post 90 of coupling attachment 84 is sized to be received by and slide into engagement with the coupling post 92 of the grille 72-1. After the inner coupling post 90 has been located within the outer coupling post 92, a threaded fastener 93 is received through a first hole 94 formed in a side of the outer coupling post 92 and a threaded, axially aligned second hole 95 formed in a side of the inner coupling post 90, whereby to attach the outdoor grille 72-1 to the coupling attachment 84. Of course, the grille 72-1 may be detached from the coupling attachment 84 by simply removing the fastener 93 from the holes 94 and 95 and sliding the coupling post 92 of grille 72-1 off the coupling post 90 of attachment 84.

In order to attach the coupling attachment 84 to the collapsible holder 1-2 while also permitting an easy removal thereof, a coupling finger 96 projects outwardly and forwardly from the first end of the base 86 of coupling attachment 84 so as extend beyond coupling plate 88. To better support the weight of the grille 72-1, a locking plate 98 also projects outwardly and forwardly from the first end of the base 86 so as to lie in spaced, parallel alignment with the coupling finger 96. A through hole 100 is formed in the locking plate 98.

In the assembled configuration, the coupling finger 96 that projects forwardly from the first end of the base 86 of coupling attachment 84 is inserted through an opening 102 formed in a first side of the outer arm member 2-2 of collapsible holder 1-2 so that the downwardly extending coupling plate 88 is positioned flush against the first side of the outer arm member 2-2. To prevent a displacement of the grille 72-1, the locking plate 98 at the first end of coupling attachment 84 is positioned along a second side of the outer arm member 2-2 and a threaded fastener 104 is inserted into the through hole 100 in locking plate 98 as well as a threaded, axially aligned hole 106 formed in the second side of arm member 2-2. Accordingly, the coupling attachment 84 to which the outdoor grille 72-1 is coupled will be reliably and detachably connected to and supported from the outer arm member 2-2 of collapsible holder 1-2.

I claim:

1. A combination comprising:
   a collapsible holder to be coupled to a trailer hitch of a motor vehicle, said collapsible holder having first, second and third arm members that extend in different directions and are pivotal relative to one another, said first arm member to be coupled to the trailer hitch, said third arm member pivotally connected between said first and second arm member& said second arm member adapted to be rotated towards and into face-to-face alignment with said third arm member, and said third arm member adapted to be rotated towards and into face-to-face alignment with said first arm member to form a compact package with said second, third and first arm members arranged one above the other; and
   a table having a coupling sleeve attached thereto, said coupling sleeve to be coupled to the second arm member of said collapsible holder, whereby said table is adapted to be supported from the trailer hitch of the motor vehicle by way of said collapsible holder.

2. The combination recited in claim 1, wherein said table has a central section having opposite sides, a top and a bottom and a pair of folding leaves pivotally coupled to said central section at said opposite sides thereof and adapted to rotate into facing alignment with the bottom of said central section.

3. The combination recited in claim 2, wherein the central section of said table has a hole formed therein, said combination further comprising an umbrella having a pole, said pole being received through the hole in central section to support said umbrella above said table.

4. The combination recited in claim 2, wherein said coupling sleeve is mounted at the bottom of the central section of said table, said coupling sleeve being sized to releasably engage the second arm member of said collapsible holder, whereby said table is adapted to be from the trailer hitch of said motor vehicle by way of said collapsible holder.

5. The combination recited in claim 2, wherein each of said pair of folding leaves of said table has a pair of pop-up hinges connected thereto and adapted to retain said pair of folding leaves in facing alignment with the bottom of said central section of said table.

6. The combination recited in claim 1, further comprising a coupling attachment having first and second ends and being detachably connected at the first end thereof to the second arm member of said collapsible holder, and an outdoor grille detachably coupled to the second end of said coupling attachment, whereby each of said table and said outdoor grille is adapted to be supported from the trailer hitch of the motor vehicle by way of the second arm member of said collapsible holder.

7. The combination recited in claim 6, wherein said coupling attachment has a first coupling post at the second end thereof and said outdoor grille has a second coupling post, said first coupling post being sized to releasably engage the second coupling post, whereby said outdoor grille is detachably connected to said coupling attachment by means of the engagement of said first and second coupling posts.

8. The combination recited in claim 7, wherein said coupling attachment has a locking plate at the first end thereof and a first hole formed through said locking plate, and the second arm member of said collapsible holder has a second hole formed therein, said locking plate being located flush against said second arm member so that said first and second holes are anally aligned, said combination further comprising a fastener removably received through said first and second holes, whereby to detachably connect the first end of said coupling attachment to the second arm member of said collapsible holder.

9. The combination recited in claim 8, wherein the first end of said coupling attachment also has a coupling finger projecting therefrom and the second arm member of said collapsible holder has an opening formed therein, said coupling finger being removably received within the opening in said second arm member, whereby to support said coupling attachment and the grille carried thereby from the second arm member of said collapsible holder.

10. A combination comprising:

a holder to be coupled to a trailer hitch of a motor vehicle, said holder having a first, horizontally extending arm member to be detachably connected to the trailer hitch, a second vertically extending arm member, and a third arm member extending at an angle between said first and second arm members;

an outdoor grille to be supported by the second, vertically extending arm member of said holder;

a first coupler by which to detachably connect said outdoor grille to said second, vertically extending arm member, a table; and a second coupler by which to detachably connect said table to said second, vertically extending arm member of said holder whereby both said outdoor grille and said table are supported by said holder at said second, vertically extending arm member thereof.

11. The combination recited in claim 10, wherein said third arm member of said holder is pivotally connected between said first, horizontally extending arm member and said second, vertically extending arm member, said second, vertically extending arm member adapted to be rotated towards and into face-to-face alignment with said third arm member and said third arm member adapted to be rotated towards and into face-to-face alignment with said first, horizontally extending arm member to form a compact package with said second, third and first arm members arranged one above the other after said outdoor grille and said table are detached from the second, vertically extending arm member of said holder.

* * * * *